United States Patent
Huang et al.

(10) Patent No.: US 11,781,679 B2
(45) Date of Patent: Oct. 10, 2023

(54) HEAT EXCHANGE PIPE JOINT AND BATTERY PACK

(71) Applicant: Jiangsu Contemporary Amperex Technology Limited, Changzhou (CN)

(72) Inventors: Xiaoteng Huang, Changzhou (CN); Xueyu Bai, Changzhou (CN)

(73) Assignee: Jiangsu Contemporary Amperex Technology Limited, Changzhou (CN)

( * ) Notice: Subject to any disclaimer, the term of this patent is extended or adjusted under 35 U.S.C. 154(b) by 860 days.

(21) Appl. No.: 16/495,298

(22) PCT Filed: Aug. 2, 2019

(86) PCT No.: PCT/CN2019/099093
§ 371 (c)(1),
(2) Date: Sep. 18, 2019

(87) PCT Pub. No.: WO2021/012307
PCT Pub. Date: Jan. 28, 2021

(65) Prior Publication Data
US 2022/0221084 A1    Jul. 14, 2022

(30) Foreign Application Priority Data

Jul. 23, 2019 (CN) .......................... 201921168552.8

(51) Int. Cl.
*F16L 5/08* (2006.01)
*H01M 10/6556* (2014.01)
(Continued)

(52) U.S. Cl.
CPC .................. *F16L 5/08* (2013.01); *F16L 5/12* (2013.01); *F16L 23/032* (2013.01);
(Continued)

(58) Field of Classification Search
CPC .... F16L 5/08; F16L 5/12; F16L 41/086; F28F 9/266; F28F 9/26; H01M 10/6556
(Continued)

(56) References Cited

U.S. PATENT DOCUMENTS 532,989 A * 1/1895 Phillips
2,441,009 A * 5/1948 Cunningham ........ F16L 41/086
285/200

(Continued)

FOREIGN PATENT DOCUMENTS

CN 204388407 U 6/2015
CN 106410316 A 2/2017
(Continued)

OTHER PUBLICATIONS

International Search Report dated May 6, 2020, Application No. PCT/CN2019/099093.
(Continued)

*Primary Examiner* — James M Hewitt, II
(74) *Attorney, Agent, or Firm* — The Dobrusin Law Firm, PC

(57) ABSTRACT

A heat exchange pipe joint includes a first pipe and a second pipe that are separately formed and in communication with each other. The first pipe is detachably connected to a second side of the installation plate, and the second pipe is detachably connected to a first side of the installation plate. When the heat exchange pipe joint is applied to the battery pack, the heat exchange pipe joint in a split-structure requires a small operation space for detachment and installation. In this case, a process of taking out the entire heat exchange pipe joint from the case can be avoided. In this way, the detachment and installation of the heat exchange pipe joint can be easy and convenient, thereby facilitating the reparation process thereof.

5 Claims, 4 Drawing Sheets

(51) Int. Cl.
*F16L 5/12* (2006.01)
*F28F 9/26* (2006.01)
*F16L 23/032* (2006.01)
*F16L 41/08* (2006.01)

(52) U.S. Cl.
CPC ............ *F16L 41/086* (2013.01); *F28F 9/266* (2013.01); *H01M 10/6556* (2015.04)

(58) Field of Classification Search
USPC .................. 285/137.11, 142.1, 205, 206
See application file for complete search history.

(56) References Cited

U.S. PATENT DOCUMENTS

| | | | | |
|---|---|---|---|---|
| 6,070,659 | A * | 6/2000 | Hosoya | ................ F28D 1/0341 |
| | | | | 285/124.1 |
| 7,591,486 | B2 * | 9/2009 | Butler | ..................... F16L 21/08 |
| | | | | 285/137.11 |
| 8,231,142 | B2 * | 7/2012 | Olver | ...................... F01D 9/065 |
| | | | | 285/142.1 |
| 2003/0214130 | A1 * | 11/2003 | Schroeder | ............. F16L 41/086 |
| | | | | 285/368 |
| 2015/0030902 | A1 * | 1/2015 | Nagano | ............ H01M 10/6568 |
| | | | | 429/120 |
| 2015/0152987 | A1 | 6/2015 | Ishikawa | |
| 2016/0049705 | A1 * | 2/2016 | Mahe | ........................ F28F 3/10 |
| | | | | 29/890.03 |
| 2017/0211724 | A1 | 7/2017 | Bocker et al. | |
| 2018/0212285 | A1 * | 7/2018 | Huang | ............ H01M 10/6568 |

FOREIGN PATENT DOCUMENTS

| | | |
|---|---|---|
| CN | 109578703 A | 4/2019 |
| CN | 109707925 A | 5/2019 |
| CN | 209016205 U | 6/2019 |
| JP | 2005158272 A | 6/2005 |
| WO | WO-2013080512 A1 * | 6/2013 ......... B60H 1/00278 |

OTHER PUBLICATIONS

Extended European Search Report dated May 28, 2021, Application No. 19762279.8.

* cited by examiner

HEAT EXCHANGE PIPE JOINT AND BATTERY PACK

The present application is based on International Application No. PCT/CN2019/099093 filed Aug. 2, 2019, which claims priority to Chinese Patent Application No. 201921168552.8, filed on Jul. 23, 2019, the content of which is incorporated herein by reference in its entirety.

TECHNICAL FIELD

The present disclosure relates to the technical field of batteries, and in particular, to a heat exchange pipe joint and a battery pack.

BACKGROUND

Currently, with an increasing requirement on energy density of battery pack, space arrangement is more and more compact. Conventionally, a heat exchange pipe joint of a heat exchange system is formed into one piece. In this case, when the heat exchange pipe joint needs to be repaired, the heat exchange pipe joint cannot be directly detached due to the narrow internal space inside a case of the battery pack. In this regard, the heat exchange pipe joint can be smoothly taken out only after detaching other components inside the case such as a battery module. Therefore, a process of detaching the one-piece heat exchange pipe joint is complicated, which causes a difficult maintenance.

SUMMARY

In view of the problems in the prior art, the present disclosure provides a heat exchange pipe joint and a battery pack. When the heat exchange pipe joint is applied to the battery pack, the heat exchange pipe joint requires a small operation space for detachment and installation, in which case the detachment and installation can be performed without detaching the components inside the case, thereby facilitating the reparation process thereof.

In an aspect, an embodiment of the present disclosure provides a heat exchange pipe joint for being fixedly installed to an installation plate, the heat exchange pipe joint includes a first pipe and a second pipe that are separately formed and in communication with each other, the first pipe is detachably connected to a second side of the installation plate, and the second pipe is detachably connected to a first side of the installation plate.

In an embodiment, the installation plate is provided with a through-hole penetrating the installation plate in a first direction, the first pipe includes a first part and a second part that are connected to each other, the first part is located at the second side of the installation plate, and the second part goes through the through-hole and is connected to the second pipe.

In an embodiment, the first part of first pipe includes a first main body and a first flange, the first main body is connected to and in communication with the second part, and the first flange is arranged at an outer circumference of a junction between the first main body and the second part and extends radially outward, and the first flange is detachably connected to the second side of the installation plate.

In an embodiment, the second pipe includes a second main body and a second flange connected to an end of the second main body and extending radially outward; the second flange includes a receiving chamber in communication with the second main body, and the second flange is detachably connected to the first side of the installation plate; the second part of the first pipe goes through the through-hole and is inserted into the receiving chamber of the second flange.

In an embodiment, the heat exchange pipe joint further includes a first sealing member, and the first sealing member is sleeved on an outer circumference of the second part, and the first sealing member is radially compressed and sandwiched between an inner circumferential surface of the receiving chamber and the second part.

In an embodiment, the second part is provided with a locating groove, and the locating groove is formed by recessing radially inward from an outer surface of the second part; the first sealing member is arranged in the locating groove.

In an embodiment, the heat exchange pipe joint further includes a second sealing member, the second sealing member is sleeved on an outer circumference of the second part, and the second sealing member is compressed and sandwiched between the installation plate and the second flange.

In an embodiment, a protrusion is provide at a side of the receiving chamber adjacent to the second main body, and the protrusion protrudes radially inward from an inner circumferential surface of the receiving chamber; an end of the second part abuts against the protrusion along the first direction.

In another aspect, an embodiment of the present disclosure provides a battery pack, the battery pack includes a case including an installation plate, the installation plate having a first side facing an interior of the case and a second side facing an exterior of the case; and the heat exchange pipe joint described above.

In an embodiment, the heat exchange pipe joint further includes a fastener, the first pipe and the second pipe are fixed to two sides of the installation plate via the fastener, and the second sealing member is compressed and sandwiched between the installation plate and the second flange.

The beneficial effects of the present disclosure are as follows.

When the heat exchange pipe joint of the present disclosure is applied to the battery pack, the heat exchange pipe joint in a split-structure requires a small operation space for detachment and installation. In this case, a process of taking out the entire heat exchange pipe joint from an interior of the case can be avoided, so that the battery module and other components inside the case do not interfere with the detachment and installation of the heat exchange pipe joint. In this way, the detachment and installation of the heat exchange pipe joint can be easy and convenient, thereby facilitating the reparation process thereof.

REFERENCE SIGNS

Figure 1:
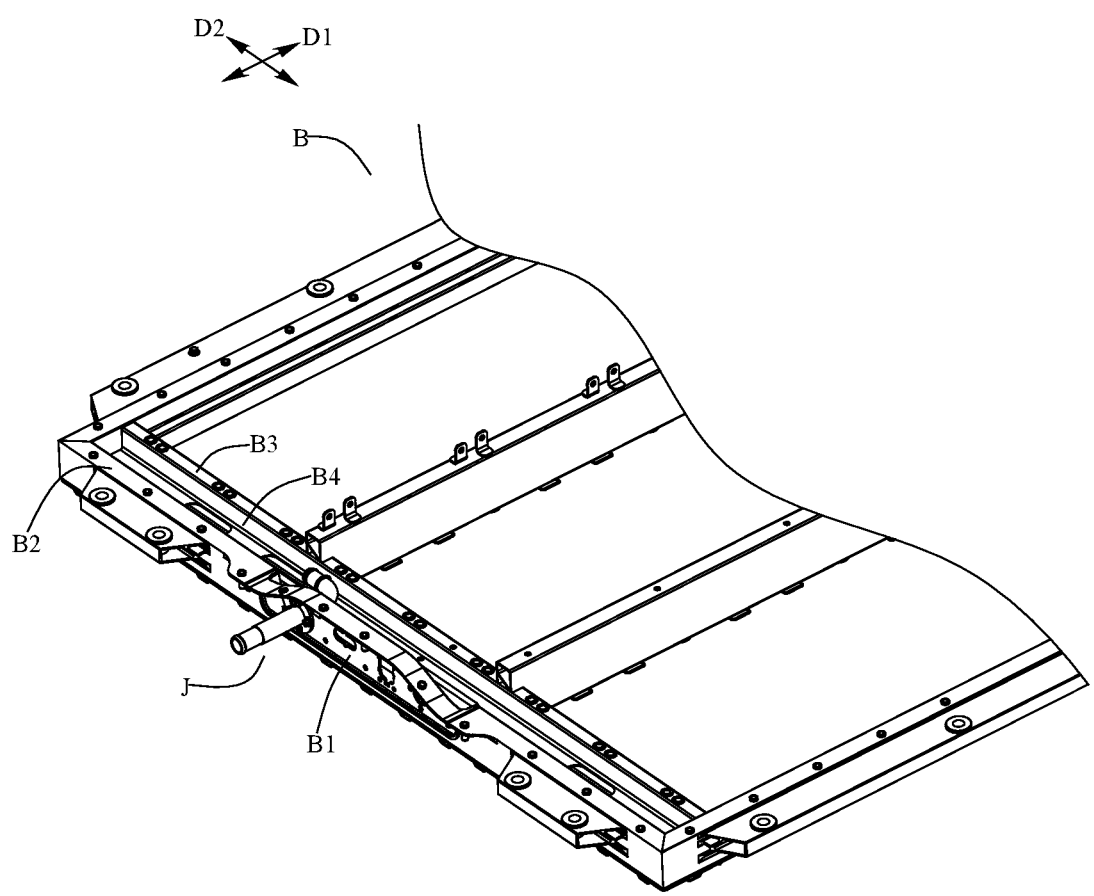
FIG. 1 is an assembled diagram of some components of a battery pack according to an embodiment of the present disclosure.

B case
B1 installation plate
B11 first side
B12 second side
B13 through-hole
B14 first hole
B2 frame
B3 first beam
B4 gap
J heat exchange pipe joint
1 first pipe
11 first part
111 first main body
112 first flange
112H second hole
12 second part
121 locating groove
2 second pipe
21 second main body
22 second flange
221 receiving chamber
221T protrusion
222 third hole
3 first sealing member
4 second sealing member
41 fourth hole
F fastener

DESCRIPTION OF EMBODIMENTS

The accompanying drawings illustrate embodiments of the present disclosure, and it should be understood that the embodiments disclosed herein are merely examples of the present disclosure, and the present disclosure can be implemented in various manners. Therefore, the details disclosed herein shall not be construed as limitations of the present disclosure, and are merely used as exemplary basis of the claims to teach those skilled in the art to implement the present disclosure in various manners.

In addition, the terms indicating directions of operation and configuration of members of the heat exchange pipe joint and the battery pack in the embodiments of the present disclosure, such as a first direction, a second direction and the like, are not absolute directions but relative directions. These indications are appropriate when the members of the heat exchange pipe joint and the battery pack are in positions shown in the figures, these directions should be interpreted differently when these positions change.

In description of the present disclosure, unless otherwise specified or stated, the terms "first" and "second" are used for descriptive purposes only and shall not be construed as indicating or implying relative importance; the term "plurality of" refers to two or more; the terms "connection", "fixation" and the like shall be broadly construed. For example, "connection" can be construed as a fixed connection or a detachable connection, an integral connection, an electrical connection, or a signal connection, and the "connection" can also be a direct connection or an indirect connection via an intermediate medium. Those skilled in the art can understand the specific meanings of the above terms in the present disclosure according to the actual situation.

FIG. 1 is an assembled diagram of some components of a battery pack according to an embodiment of the present disclosure.

The battery pack according to this embodiment includes a case B, a heat exchange pipe joint J, and a fastener F. The battery pack further includes a heat exchange plate (not shown) and a battery module (not shown).

The case B includes an installation plate B1 and a frame B2. In an embodiment, the case B further includes a first beam B3.

The installation plate B1 is fixed to the frame B2. The installation plate B1 has a first side B11 facing an interior of the case B, and a second side B12 facing an exterior of the case B. The installation plate B1 is provided with a through-hole B13 penetrating the installation plate B1 in a first direction D1. The installation plate B1 is further provided with a first hole B14 penetrating the installation plate B1 in the first direction D1. It should be noted that the first direction D1 is a thickness direction of the installation plate B1.

The frame B2 encloses a circumferentially closed chamber, and at least a part of the battery module is received in the chamber and is in contact with a heat exchange plate as described below.

When the case B includes a first beam B3, the first beam B3 extends in a second direction D2 that is perpendicular to the first direction D1. The first beam B3 is adjacent to the frame B2 and the installation plate B1 along the first direction D1, and the first beam B3 is spaced from the frame B2 and the installation plate B1 by a gap B4 that extends in the second direction D2. It should be noted that the case B of the battery pack may not include the first beam B3. The detachment and installation of the heat exchange pipe joint J is not affected by the presence or absence of the first beam B3.

Figure 2:
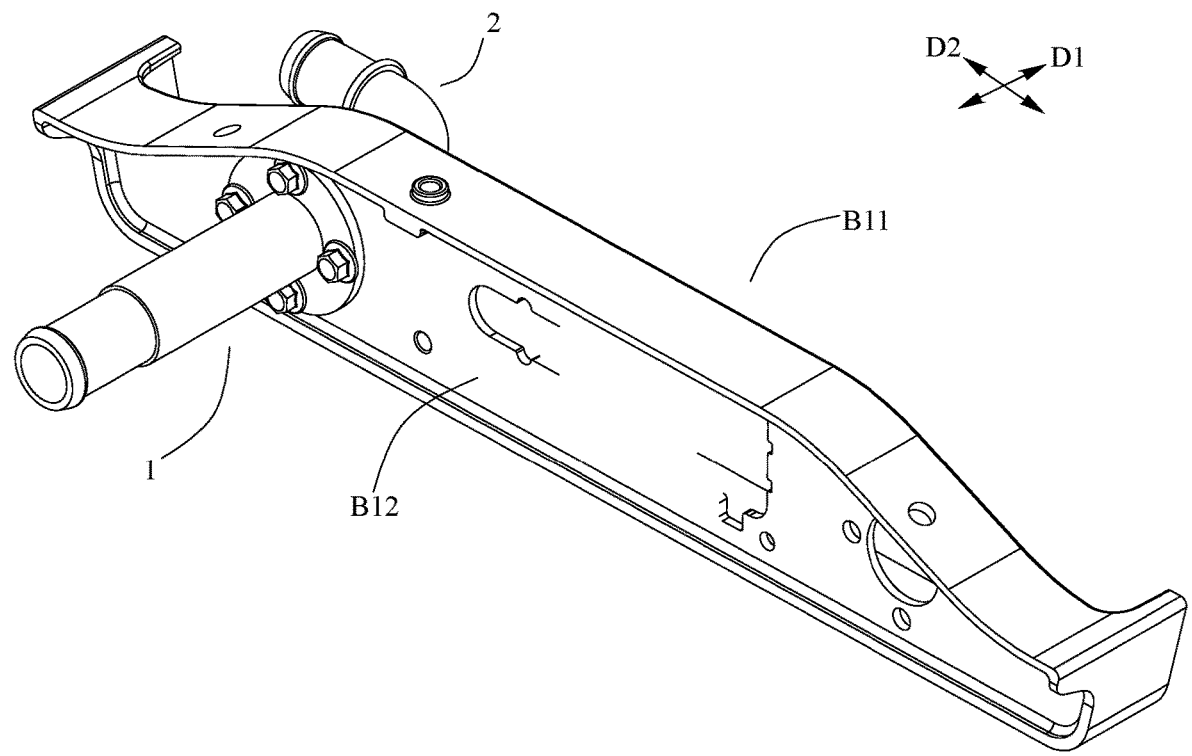
FIG. 2 is an assembled diagram of a heat exchange pipe joint and a installation plate.
Figure 3:
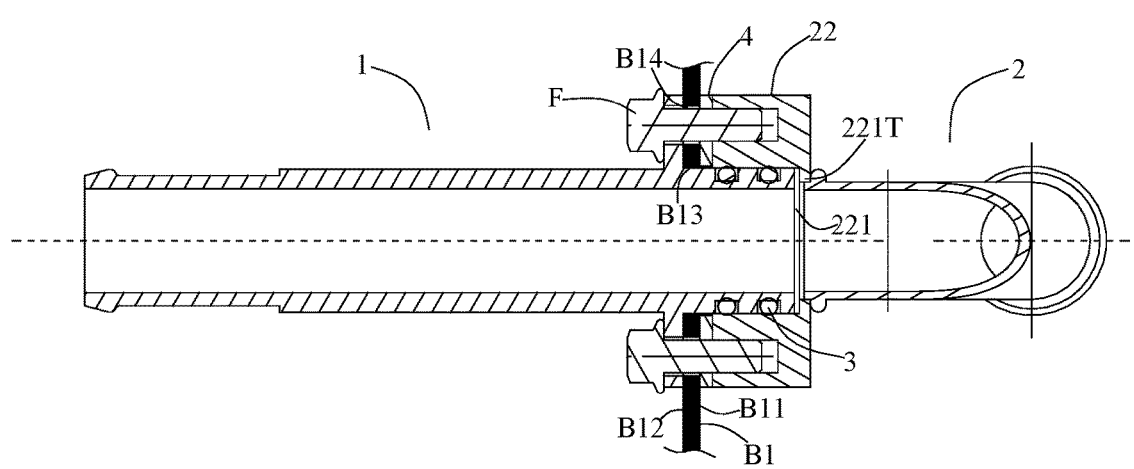
FIG. 3 is a cross-sectional view of FIG. 2.
Figure 4:
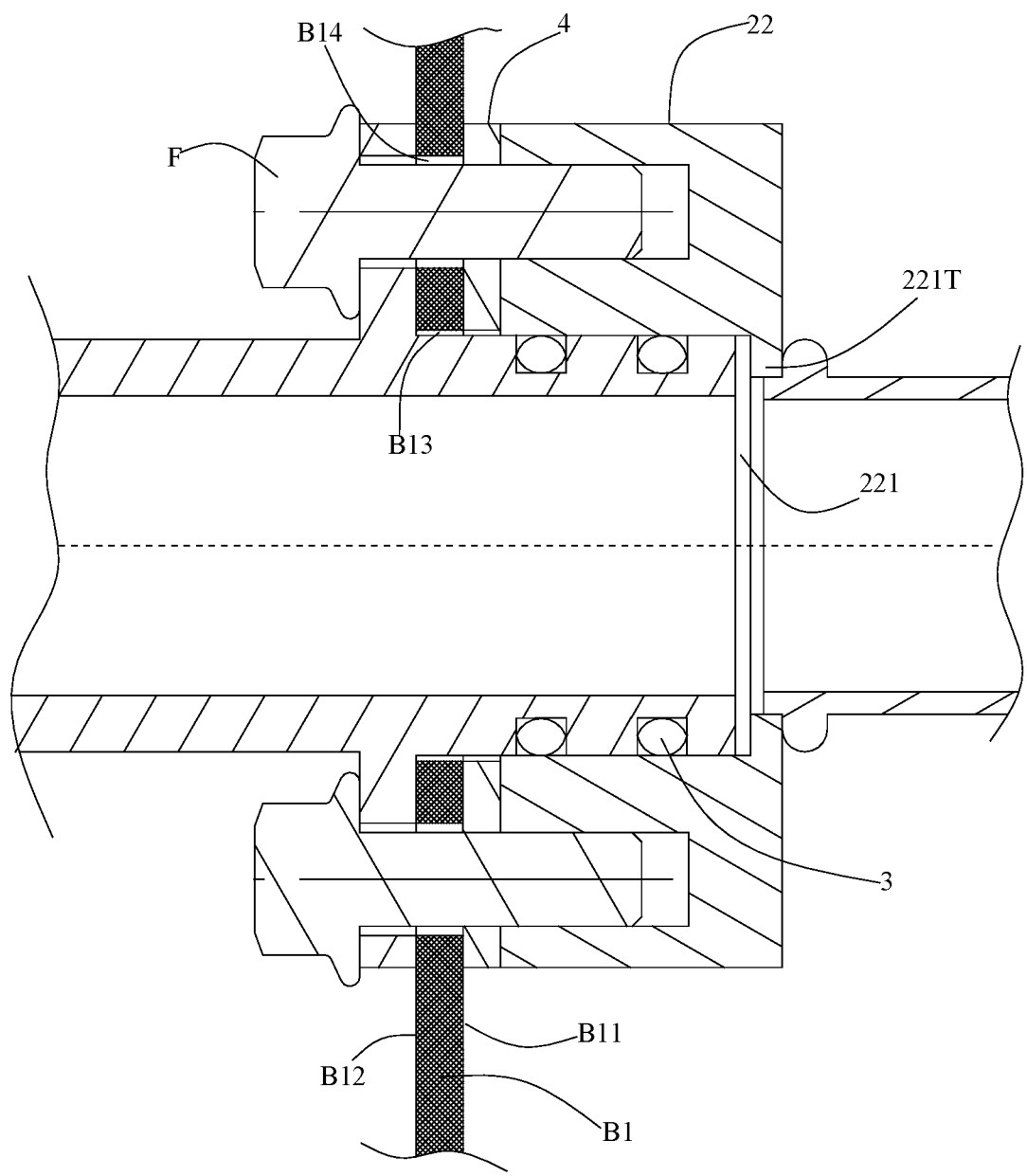
FIG. 4 is a partial enlarged view of FIG. 3.
Figure 5:
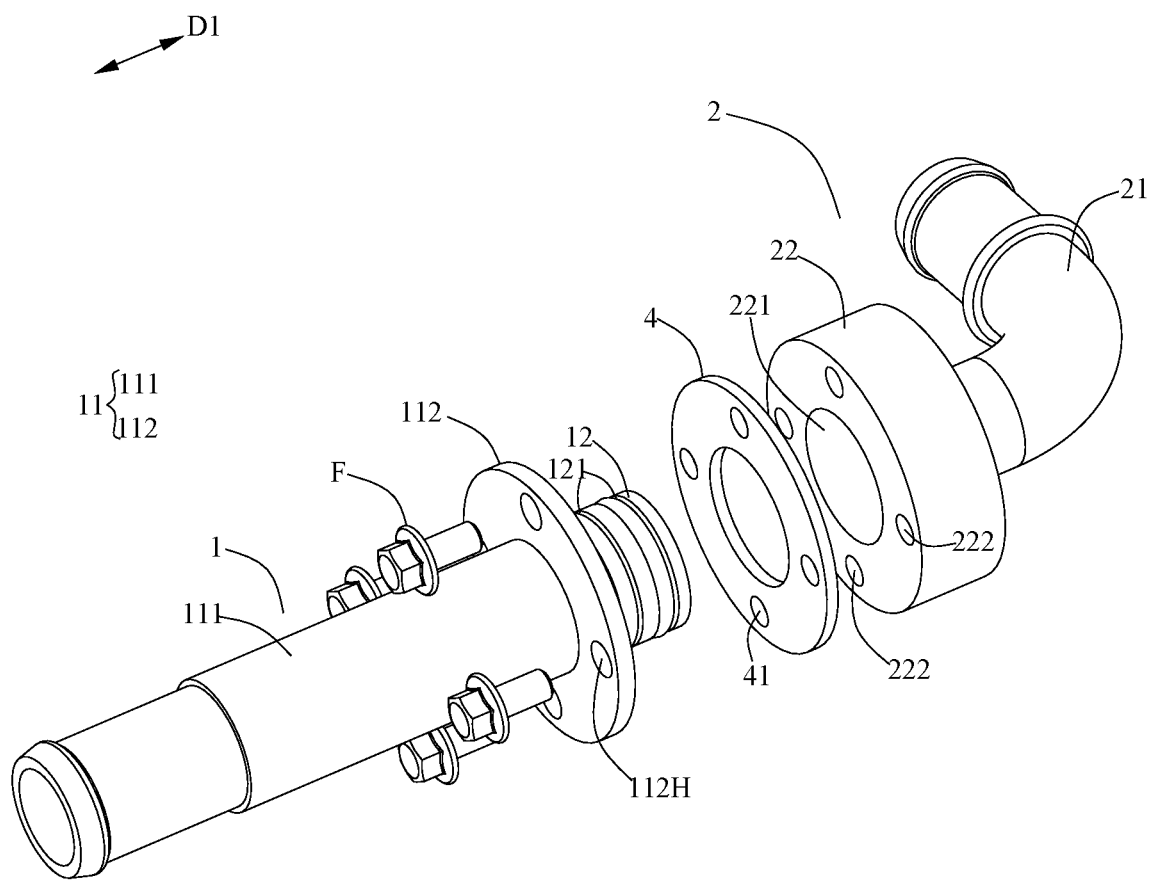
FIG. 5 is an exploded diagram of a heat exchange pipe joint, in which a third sealing member is not shown.

FIG. 2 is an assembled diagram of a heat exchange pipe joint and an installation plate; FIG. 3 is a cross-sectional view of FIG. 2; FIG. 4 is a partial enlarged view of FIG. 3; and FIG. 5 is an exploded diagram of a heat exchange pipe joint, in which a third sealing member is not shown.

The heat exchange pipe joint J is fixedly mounted to the installation plate B1. The heat exchange pipe joint J includes a first pipe 1 and a second pipe 2 that are formed separately and in communication with each other. The heat exchange pipe joint J further includes a first sealing member 3 and a second sealing member 4.

The first pipe 1 is detachably connected to the second side B12 of the installation plate B1. The first pipe 1 includes a first part 11 and a second part 12 that are connected to each other.

The first part 11 is located at the second side B12 of the installation plate B1. The first part 11 of the first pipe 1 includes a first main body 111 and a first flange 112, and the first main body 111 is connected to and in communication with the second part 12. The first flange 112 is arranged at an outer circumference of a junction between the first main body 111 and the second part 12 and extends radially outward. The first flange 112 is detachably connected to the second side B12 of the installation plate B1. In an embodiment, the first flange 112 is provided with a second hole 112H, and the second hole 112H goes through the first flange 112 and corresponds to the first hole B14. Further, a plurality of second holes 112H is provided and arranged at an outer circumference of the first flange 112 with intervals. By providing the second hole 112H, the fastener F can penetrate the corresponding second hole 112H to detachably connect the first flange 112 to the installation plate B1.

The second part 12 of the first pipe 1 goes through the through-hole B13 and is connected to the second pipe 2. The first pipe 1 is inserted into the second pipe 2 from the second side B12 of case B (an outer side of case B). Since the space outside the case B is not limited, the insertion of the first pipe 1 into the second pipe 2 is not affected by a length of the first pipe 1. In an embodiment, the second part 12 is provided with a locating groove 121, the locating groove 121 is formed by radially recessing inward from an outer surface of the second part 12. The locating groove 121 is configure to position the first sealing member 3.

The second pipe 2 is detachably connected to the first side B11 of the installation plate B1. The second pipe 2 includes a second main body 21 and a second flange 22.

In the battery pack according to the present disclosure, the first pipe 1 and the second pipe 2 of the heat exchange pipe joint J are separately formed, the first pipe 1 is detachably connected to the second side B12 of the installation plate B1, and the second pipe 2 is detachably connected to the first side B11 of the installation plate B1. In the prior art, the heat exchange pipe joint is usually formed into one piece. When the one-piece heat exchange pipe joint needs to be repaired or replaced, due to the limited operation space of the battery pack, the heat exchange pipe joint can be smoothly taken out from the interior of the case B only when other obstructive components inside the case B such as the battery module are detached firstly. Therefore, a process of detaching and installing the one-piece heat exchange pipe joint will be complicated, which results in complex operation. In contrast, in the present disclosure, the heat exchange pipe joint J in split-structure requires a smaller operation space, and thus a process of taking out the entire heat exchange pipe joint J from the interior of the case B can be avoided. In this way, the battery module and other components inside the case B will not affect detachment of the heat exchange pipe joint J. When the heat exchange pipe joint J needs to be repaired or replaced, it is only required to detach the first pipe 1 and the second pipe 2 of the heat exchange pipe joint J from the outer side and an inner side of the installation plate B1, respectively. With such a split-structure, the attachment and installation of the heat exchange pipe joint J is easy and convenient, thereby facilitating the maintenance thereof.

In an embodiment, when the battery pack includes the first beam B3 described above, the second main body 21 of the second pipe 2 is bent in the gap B4 from a longitudinal direction to a lateral direction, so as to adapt to an internal dimension of the case B. The second main body 21 of the second pipe 2 is in communication with the heat exchange plate, in order to introduce the heat exchange fluid into the heat exchange plate or discharge the heat exchange fluid from the heat exchange plate to the outside of the battery pack, thereby achieving circular heat exchange of the battery module inside the battery pack.

The second flange 22 is connected to an end of the second main body 21 and extends radially outward. The second flange 22 includes a receiving chamber 221, and the receiving chamber 221 is in communication with the second main body 21. The second flange 22 is detachably connected to the first side B11 of the installation plate B1. The second part 12 of the first pipe 1 goes through the through-hole B13 and is inserted into the receiving chamber 221 of the second flange 22. In an embodiment, a side of the receiving chamber 221 close to the second main body 21 is provided with a protrusion 221T, and the protrusion 221T protrudes radially inward from an inner circumferential surface of the receiving chamber 221. The second flange 22 is provided with a third hole 222, and the third hole 222 corresponds to the first hole B14. Further, the third hole 222 is a threaded hole. In an embodiment, a plurality of third holes 222 is provided and arranged at intervals along an outer circumference of the second flanges 22. By providing the third hole 222, an end of the fastener F can be threaded into the corresponding third hole 222, so as to detachably connect the second flange 22 to the installation plate B1.

As shown in FIG. 3, the first sealing member 3 is sleeved on an outer circumference of the second part 12, and the first sealing member 3 is radially compressed between the inner circumferential surface of the receiving chamber 221 and the second part 12. When the second part 12 of the first pipe 1 is provided with the locating groove 121, the first sealing member 3 is arranged in the locating groove 121 of the second part 12 of the first pipe 1. The locating groove 121 is used to position the first sealing member 3, thereby preventing the first sealing member 3 from moving during the installation process and affecting a sealing effect. A plurality of locating grooves 121 is provided and spaced apart from each other in the first direction D1. Correspondingly, a plurality of first sealing members 3 is provided, and each of the plurality of first sealing members 3 is arranged in the corresponding locating groove 121. In an embodiment, the first sealing member 3 is an elastic sealing ring, but not limited thereto. For example, the first sealing member 3 may also be a sealing adhesive. The first sealing member 3 ensures the sealing between the second part 12 of the first pipe 1 and the receiving chamber 221 of the second pipe 2, thereby preventing a risk of liquid leakage at the junction between the first pipe 1 and the second pipe 2. Moreover, by providing the plurality of first sealing members 3, the sealing effect between the second part 12 of the first pipe 1 and the receiving chamber 221 of the second pipe 2 can be improved.

The second sealing member 4 is sleeved on the outer circumference of the second part 12 of the first pipe 1, and the second sealing member 4 is compressed and sandwiched between the installation plate B1 and the second flange 22 in the first direction D1. The second sealing member 4 ensures the sealing between the second flange 22 of the second pipe 2 and the installation plate B1, thereby avoiding a formation of a gap between the second flange 22 of the second pipe 2 and the installation plate B1. Thus, external impurities are prevented from entering a region between the second part 12 and the receiving chamber 221 via the gap between the second flange 22 and the installation plate B1, thereby preventing the external impurities from contaminating the first sealing member 3 and affecting the sealing effect of the first sealing member 3. Moreover, the first sealing member 3 and the second sealing member 4 have a double-sealing effect on the heat exchange pipe joint J, reducing the risk of liquid leakage at the junction between the first pipe 1 and the second pipe 2 and at the junction between the second pipe 2 and the installation plate B1, such that the sealing effect of the heat exchange pipe joint J is improved. In an embodiment, the second sealing member 4 is an elastic sealing gasket, but not limited thereto. For example, the second sealing member 4 may also be a sealing adhesive. With reference to FIG. 3, when a side of the receiving chamber 221 close to the second main body 21 is provided with the above-described protrusion 221T, and the second sealing member 4 is at a maximum compression amount or the second sealing member 4 has not reached the maximum compression amount, an end of the second part 12 abuts against the protrusion 221T along the first direction D1. The protrusion 221T effectively controls the compression amount of the second sealing member 4 in the first direction D1, which prevents the second sealing member 4 from being crushed and affecting the sealing effect of the heat exchange pipe joint J, thereby ensuring the double-sealing effect of the heat exchange pipe joint J.

As shown in FIG. 3 to FIG. 5, the fastener F fixes the first pipe 1 and the second pipe 2 to two sides of the installation plate B1, respectively. In an embodiment, the fastener F is a fastening bolt. The fastening bolt sequentially goes through the second hole 112H, the first hole B14, and the fourth hole 41 and then is threaded into the third hole 222, so as to fix the first pipe 1 and the second pipe 2 to the two sides of the installation plate B1 and make the second sealing member 4 be compressed between the installation plate B1 and the second flange 22. The first pipe 1 and the second pipe 2 are fixed to the two sides of the installation plate B1 by the fastener F, and the fastener F is installed from the second side B12 of the installation plate B1 (the outer side of the case B) and fixes the first pipe 1 and the second pipe 2 to the two sides of the installation plate B1, such that operation space of the fastener F is not limited. Thus, the detachment and installation of the heat exchange pipe joint J is easy and convenient. Moreover, during the installation process, the protrusion 221T can control a depth of the fastener F threaded into the third hole 222, thereby ensuring the compression amount of the second sealing member 4 and preventing the fastener F from being threaded too deep to crush the second sealing member 4. In this way, it ensures the sealing effect of the heat exchange pipe joint J.

The heat exchange plate is fixed at a lower side of the frame B2, and the heat exchange plate is used for the heat exchange of the battery module inside the battery pack. It should be noted that two above-described heat exchange pipe joints J are provided, one of which can be used as a liquid inlet pipe, the other one of which can be used as a liquid outlet pipe. The two heat exchange pipe joints J are both in communication with the heat exchange plate. Thus, the heat exchange pipe joint J serving as the liquid inlet pipe, the heat exchange plate, and the heat exchange pipe joint J serving as the liquid outlet pipe can together form a pipe line in which the heat exchange liquid can flow. The heat exchange liquid flows in the piping, so that heat of the battery module inside the case B can be taken away in time, thereby ensuring temperature stability of the battery module and improving the service life of the battery module.

The above detailed description describes various exemplary embodiments, but is not intended to limit the present application to the disclosed combinations. Accordingly, the various features disclosed herein can be combined together to form various combinations that are not shown for the sake of clarity.

What is claimed is:

1. A heat exchange pipe joint for being fixedly installed to an installation plate, wherein the heat exchange pipe joint comprises a first pipe and a second pipe that are separately formed and in communication with each other,
   wherein the first pipe is detachably connected to a second side of the installation plate, and the second pipe is detachably connected to a first side of the installation plate opposite to the second side of the installation plate;
   wherein the installation plate is provided with a through-hole penetrating the installation plate in a first direction;
   the first pipe comprises a first part and a second part that are connected to each other, the first part is located at the second side of the installation plate, and the second part goes through the through-hole and is connected to the second pipe;
   wherein the second pipe comprises a second main body and a second flange, and the second flange is connected to an end of the second main body and extends radially outward;
   the second flange comprises a receiving chamber in communication with the second main body, and an entire of the second flange is detachably connected to the first side of the installation plate; and
   the second part of the first pipe is inserted into the receiving chamber of the second flange;
   wherein the heat exchange pipe joint further comprises a second sealing member, the second sealing member is sleeved on an outer circumference of the second part, and the second sealing member is compressed and sandwiched between the installation plate and the second flange so that no gap is formed between the second flange and the installation plate;
   wherein the second sealing member comprises at least one through-hole;
   wherein a protrusion is provided at a side of the receiving chamber close to the second main body, and the protrusion protrudes radially inward from an inner circumferential surface of the receiving chamber; and
   an end of the second part abuts against the protrusion along the first direction; and
   wherein an outer surface of the second main body protrudes away from a center of the second part to form another protrusion, and the another protrusion abuts against the protrusion that is located at the end of the second part, and the another protrusion is independent from the protrusion.

2. The heat exchange pipe joint according to claim 1, wherein the first part of first pipe comprises a first main body and a first flange, the first main body is connected to and in communication with the second part, the first flange is arranged at an outer circumference of a junction between the first main body and the second part and extends radially outward, and the first flange is configured to be detachably connected to the second side of the installation plate.

3. The heat exchange pipe joint according to claim 1, wherein the heat exchange pipe joint further comprises a first sealing member, the first sealing member is sleeved on an outer circumference of the second part, and the first sealing member is radially compressed and sandwiched between an inner circumferential surface of the receiving chamber and the second part.

4. The heat exchange pipe joint according to claim 3, wherein the second part is provided with a locating groove, and the locating groove is formed by recessing radially inward from an outer surface of the second part;
   the first sealing member is arranged in the locating groove.

5. A battery pack, comprising:
   a case comprising an installation plate, the installation plate having a first side facing an interior of the case and a second side facing an exterior of the case; and
   the heat exchange pipe joint according to claim 1.

* * * * *